(No Model.)
H. VIEREGG.
FIRE ESCAPE.
No. 450,899. Patented Apr. 21, 1891.
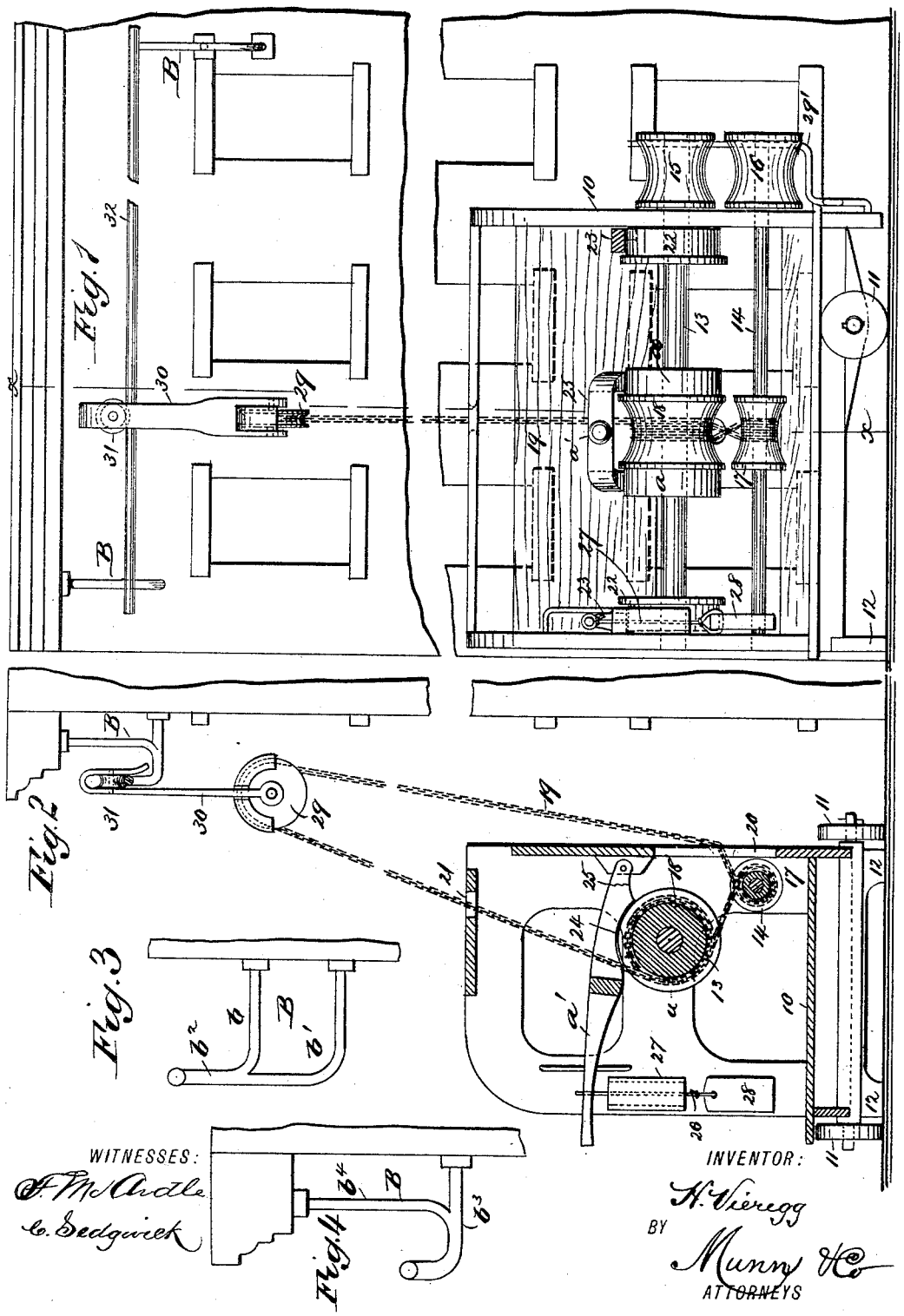
WITNESSES:
F. McArdle
C. Sedgwick
INVENTOR:
H. Vieregg
BY
Munn & Co.
ATTORNEYS

UNITED STATES PATENT OFFICE.

HENRY VIEREGG, OF GRAND ISLAND, NEBRASKA.

FIRE-ESCAPE.

SPECIFICATION forming part of Letters Patent No. 450,899, dated April 21, 1891.

Application filed August 5, 1890. Serial No. 361,072. (No model.)

*To all whom it may concern:*

Be it known that I, HENRY VIEREGG, of Grand Island, in the county of Hall and State of Nebraska, have invented a new and useful Improvement in Fire-Escapes, of which the following is a full, clear, and exact description.

My invention relates to an improvement in fire-escapes, and has for its object to provide a device capable of being expeditiously manipulated and so constructed that persons may be lowered in safety from high buildings to the ground.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a front elevation of the device illustrated in position in front of a building and as connected therewith. Fig. 2 is a section on line $x\ x$ of Fig. 1, and Figs. 3 and 4 are side elevations of brackets adapted for attachment to a building.

The body of the device consists of a cage or casing 10, preferably constructed of metal, which cage or casing is open at its front and is preferably supported upon two wheels 11, journaled near one end of the bottom, the opposite end being provided with downwardly-extending legs 12, whereby the cage, when placed in position in front of a building, will be prevented from slipping, as the legs will engage with the ground, and may be readily wheeled from place to place by elevating the end of the cage, to which the legs are secured. Two shafts 13 and 14 are journaled in the ends of the cage, and at one end the shafts are projected beyond the cage and have secured to their extending ends drums 15 and 16, as shown in Fig. 1. The shaft 13 is above the shaft 14 and is nearer the front or open side of the cage, the lower shaft 14 being located quite near the back of the cage. At or near the center of the lower shaft a drum 17 is keyed or otherwise secured, and immediately over the drum 17 a larger drum 18 is secured to the upper shaft 13. An endless chain 19 is passed through an opening 20 in the back of the cage and wound upon the lower drum 17 as many times as may be deemed advisable, and the said chain is further wound upon the upper and larger drum 18, and is carried upward beyond the cage through an aperture 21 in the top, as is best shown in Fig. 2. A friction-wheel 22 is secured to the upper shaft within the cage near each end, as is shown in Fig. 1, and at the back of the cage, at each end, a brake 23 is pivoted, the said brakes being curved, as shown at 24 in Fig. 2, to fit the periphery of the friction-wheels, and the handles of the brakes extend outward a convenient distance beyond the front of the cage, or may terminate within the cage, if desired. A double brake 25, adapted for use in connection with the upper drum 18, is pivoted also at the rear of the cage, the members of the said double brake being adapted for engagement with friction-surfaces $a$, formed integral with the drum. The double brake is provided with but one handle $a'$, as illustrated in Fig. 1. One of the end brakes is rendered automatic in its action by adjustably securing to the handle thereof a link 26, which link extends downward through a suitable guide-sleeve 27, and is provided at its lower end with an attached weight 28, which weight may be of one hundred and twenty-five or one hundred and fifty pounds. The endless chain 19, in addition to being passed over the drums of the cage, is passed over a sheave-pulley 29, pivoted in the lower end of a hanger 30. The said hanger at its upper end is bent over and downward upon itself, and between the members thus formed a peripherally-grooved wheel 31 is pivoted.

Brackets B are secured to the face of the building or to the cornice, or to both, the said brackets being located between the roof and the lintels of the upper windows. The brackets are adapted to support in a horizontal position a rod 32, upon which rod, when the device is in service, the grooved wheel of the hanger is adapted to travel. Two forms of the brackets are illustrated, that shown in Fig. 3 being adapted for attachment to the building only, and consists of two spaced horizontal members $b$ and $b'$, connected at their outer ends by a vertical member $b^2$, which extends upward beyond the horizontal members. The horizontal members at their inner ends are threaded or otherwise adapted to be secured to the building.

The bracket B (illustrated in Fig. 4) is essentially of the shape of an inverted T. The lower horizontal member $b^3$ is upturned at its outer end for attachment to the rod 32 and threaded at its inner end or otherwise adapted to enter the face of the building, the vertical or shank member $b^4$ being threaded or otherwise treated to insure its attachment to a cornice.

In operation, the hanger being upon the rod 32 and the endless chain connected with the drums, the device may be moved readily to bring the chain over or near any window from which a person desires to escape. The person escaping should wear a harness of any description provided with a clip, whereby it may be attached to a link of the chain. After the person is supported by the chain the frictional contact of the chain with the drums will be sufficient to enable a light person to descend at an average speed. If the descending person is very heavy, one or more of the brakes may be applied; but if the person does not weigh much more than the weight 28 the brake to which the weight is applied will automatically control the rapidity of the descent.

Two drums 17 18 or 15 16 are employed, because I use an endless chain, which might slip suddenly if only a single drum were used. If a single drum were used and its shaft were braked, the endless chain might slip if a heavy person should be suddenly suspended thereon, even if the chain should be wound on the drum. If the endless chain should be wound too many times around the drum, the overlapping layers or coils would prevent the chain from unwinding properly; but by using two drums the chain will move properly and never slide on the drums, but always cause them to rotate, so that the chain may be controlled from a brake-lever. The chain being endless is always in position and is entirely different in its action from a chain having a basket on its ends, as will be readily understood.

In the event that the cage is made small enough to store away within the dwelling, the hanger, with the chain attached, is left in position upon the building. When the cage is to be used and is brought into position in front of the building, the inner drums need not be employed, as the chains may be much more conveniently and quickly wrapped upon the outer drums 15 and 16, the operation of the device remaining the same.

In order that the chain may not slip from the drums 15 and 16 when thereon, I provide a guide-fork 29' and locate it at one side of the said drums.

Having thus described my invention, I claim as new and desire to secure by Letters Patent—

1. In a fire-escape, the combination, with a cage, shafts journaled in said cage, a drum secured to each shaft, and friction-wheels secured to one of the shafts, of an endless chain passed around the drums, and brakes adapted for engagement with the friction-wheels, substantially as shown and described.

2. In a fire-escape, the combination, with a cage, shafts journaled in said cage, drums secured to said shaft, and friction-wheels attached to one of the shafts, of an endless chain wound around the drums, brakes engaging the friction-wheels, and a weight adjustably attached to one of the brakes, as and for the purpose set forth.

3. A fire-escape comprising the ground frame or cage having wheels at one end and legs at the other to prevent the frame from sliding, two drums mounted in the frame, a braking mechanism, an endless chain wound around both drums, a traveling hanger provided with a pulley, over which the upper bend of the chain passes, substantially as set forth.

4. In a fire-escape, the combination, with a cage, shafts journaled in said cage, drums secured upon said shafts, friction-wheels attached to one of the shafts, and brakes pivoted in the cage and engaging with the friction-wheels, one of the brakes being provided with an adjustable weight, of brackets adapted for attachment to the building, a horizontal rod supported by said brackets, a hanger provided with a grooved wheel journaled at its upper end and adapted to travel upon the rod, and a sheave-pulley at its lower end, over which the endless chain is adapted to pass, substantially as and for the purpose set forth.

HENRY VIEREGG.

Witnesses:
J. F. ACKER,
EDGAR TATE.